(12) United States Patent
Koshy

(10) Patent No.: US 6,451,876 B1
(45) Date of Patent: Sep. 17, 2002

(54) TWO COMPONENT THERMOSETTABLE COMPOSITIONS USEFUL FOR PRODUCING STRUCTURAL REINFORCING ADHESIVES

(75) Inventor: Vettithara C. Koshy, Bloomfield Hills, MI (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/974,459

(22) Filed: Oct. 10, 2001

Related U.S. Application Data

(63) Continuation-in-part of application No. 09/946,584, filed on Sep. 4, 2001, now abandoned, which is a continuation of application No. 09/685,551, filed on Oct. 10, 2000.

(51) Int. Cl.$^7$ .................................................. C08J 9/32
(52) U.S. Cl. ..................... 523/219; 521/54; 521/89; 521/94; 521/95; 521/135; 521/140; 521/178
(58) Field of Search .............................. 521/54, 89, 94, 521/95, 140, 135, 178; 523/219

(56) References Cited

U.S. PATENT DOCUMENTS

| | | | |
|---|---|---|---|
| 2,575,558 A | 11/1951 | Newey et al. | 154/140 |
| 4,595,623 A | 6/1986 | DuPont et al. | 428/195 |
| 4,737,407 A | 4/1988 | Wycech | 428/323 |
| 4,751,249 A | 6/1988 | Wycech | 521/54 |
| 4,769,391 A | 9/1988 | Wycech | 521/54 |
| 4,836,516 A | 6/1989 | Wycech | 267/279 |
| 4,853,270 A | 8/1989 | Wycech | 428/68 |
| 4,861,097 A | 8/1989 | Wycech | 296/188 |
| 4,923,902 A | 5/1990 | Wycech | 521/178 |
| 4,978,562 A | 12/1990 | Wycech | 428/35.8 |
| 4,995,545 A | 2/1991 | Wycech | 228/119 |
| 5,124,186 A | 6/1992 | Wycech | 428/35.8 |
| 5,274,006 A | * 12/1993 | Kagoshima et al. | |
| 5,453,453 A | 9/1995 | Lamon et al. | 521/54 |
| 5,470,886 A | 11/1995 | Makhlouf et al. | 521/59 |
| 5,575,526 A | 11/1996 | Wycech | 296/205 |
| 5,712,317 A | 1/1998 | Makhlouf et al. | 521/76 |
| 5,755,486 A | 5/1998 | Wycech | 296/188 |
| 5,804,608 A | 9/1998 | Nakazato et al. | 521/135 |
| 5,859,096 A | 1/1999 | Hoge et al. | 523/427 |
| 5,884,960 A | 3/1999 | Wycech | 296/146.6 |
| 5,888,600 A | 3/1999 | Wycech | 428/35.9 |
| 5,996,167 A | 12/1999 | Close | 15/230.12 |
| 6,003,274 A | 12/1999 | Wycech | 52/232 |
| 6,040,350 A | 3/2000 | Fukui | 521/135 |
| 6,058,673 A | 5/2000 | Wycech | 52/721.4 |
| 6,068,424 A | 5/2000 | Wycech | 403/269 |
| 6,096,403 A | 8/2000 | Wycech | 428/122 |
| 6,103,784 A | 8/2000 | Hilborn et al. | 523/219 |
| 6,110,982 A | 8/2000 | Russick et al. | 521/54 |
| 6,165,588 A | 12/2000 | Wycech | 428/122 |
| 6,168,226 B1 | 1/2001 | Wycech | 296/146.6 |
| 6,199,940 B1 | 3/2001 | Hopton et al. | 296/187 |

FOREIGN PATENT DOCUMENTS

| | | |
|---|---|---|
| AU | WO9305103 | 3/1993 |
| EP | 0501916 | 2/1992 |
| EP | 0838499 | 4/1998 |
| EP | 0891918 | 1/1999 |
| EP | 0893332 | 1/1999 |
| WO | WO9908854 | 2/1999 |
| WO | WO0012595 | 3/2000 |
| WO | WO0027920 | 5/2000 |
| WO | WO0052086 | 9/2000 |

OTHER PUBLICATIONS

JP 8142260, Abstract.
JP 11263865, Abstract.
"EPI–CUR Curing Agent 3295" product literature downloaded from Shell Chemicals Website (www.resins–versatics.com) on Jun. 9, 2000.
"EPI–CUR Curing Agent 3055" product literature downloaded from Shell Chemicals Website (www.resins–versatics.com) on Jun. 9, 2000.
"EPI–CUR Curing Agent 3055" product literature downloaded from Shell Chemicals Website (www.resins–versatics.com) on Jun. 9, 2000.
Editor Leonard J. Calbo, Handbook of Coatings Additives; 1992; p 277–299; vol. 2; Marcel Dekker, Inc.; New York.
Marcel Dekker, Inc., Handbook of Coatings, Additives, vol. 2, 1992; Hall et al., "Epoxy Curing Agents", pp. 277–299.
Encyclopedia of Polymer Science and Engineering, vol. 6, 1986, "Epoxy Resins", pp. 322–382.

* cited by examiner

Primary Examiner—Morton Foelak
(74) Attorney, Agent, or Firm—Stephen D. Harper

(57) ABSTRACT

A two part system for producing structural reinforcing adhesives is provided wherein one component containing epoxy resin is combined with a second component containing a specified curative system. An aliphatic polyamine, an amidoamine, an alcohol and an adduct of a polyamine and an epoxide are present in the curative system. When a thermally activated blowing agent is utilized, the resulting foam is remarkably uniform in cell structure and has improved strength and modulus. Hollow inorganic microspheres are employed to reduce the density of the thermoset produced from the two part system.

55 Claims, No Drawings

TWO COMPONENT THERMOSETTABLE COMPOSITIONS USEFUL FOR PRODUCING STRUCTURAL REINFORCING ADHESIVES

CROSS-REFERENCE TO RELATED APPLICATIONS

This application is a continuation-in-part of Ser. No. 09/946,584, filed Sep. 4, 2001 now abandoned, which is a continuation of Ser. No. 09/685,551 filed Oct. 10, 2000.

FIELD OF THE INVENTION

The invention pertains to two part thermosettable composition systems based on epoxy resins. Each component of the system exhibits good storage stability (e.g., no phase separation) yet reacts when combined to provide a cured material having exceptionally good compression strength and modulus. When a blowing agent is present, the foam which is produced is remarkably uniform in appearance and is essentially free of the large voids often found in conventional two part thermosettable compositions, even when a relatively large mass is utilized.

DISCUSSION OF THE RELATED ART

Methods of reinforcing hollow structural members using two part, epoxy-resin-based systems are known in the art, as illustrated by the disclosure of U.S. Pat. No. 4,995,545 (incorporated herein by reference in its entirety). One part is a mixture of thermosetting resin and expandable microspheres, preferably also including a filler such as hollow glass microspheres in an amount effective to provide a paste-like consistency. The second part includes a curing agent which is effective to cross-link and cure the thermosetting resin present in the first part when the two parts are combined, as well as a filler such as the aforementioned hollow glass microspheres. An exothermic reaction takes place upon mixing, causing the expandable microspheres to increase in size and thereby foaming the composition.

U.S. Pat. No. 4,995,545 suggests that suitable curing agents for the second part of the system are primary polyamines, secondary polyamines, and polyamides (including aliphatic amidoamines). One problem that has arisen with the two part systems described in the aforementioned patent is that although the second part has good chemical stability at ambient temperatures, the curatives tend to phase separate from the hollow glass microspheres preferred for use as the filler material.

In particular, when the curing agent side is stored in a 55-gallon drum, the hollow glass microspheres phase separate to form a hard top layer over a bottom liquid layer comprising the curatives. Additionally, the curing agent side phase separates when heated and/or when pressure is applied, even when freshly prepared. The liquid curing agents tend to drip, for example, when the curing agent side is heated at about 66° C. (150° F.) and subjected to an application pressure of about 35 kg/cm² (500 psi). These problems make it quite difficult to dispense or handle the curing agent side by pumping, as would be desirable in an OEM vehicle assembly operation. It would therefore be highly desirable to develop a second part which exhibits better storage and processing stability and is pumpable at elevated temperatures and pressures.

Another problem which has been encountered with known two part systems is the tendency for large voids or holes to develop in the thermosettable composition as the heat generated by the exothermic reaction of the two parts expands the expandable microspheres. This problem is especially pronounced when reactive diluents having relatively low boiling points are present in the first part of the two part system and when a comparatively large mass of the thermosettable composition is being used. The non-uniformity of the resulting foam limits the compression strength and modulus levels which can be attained with such systems. Since these properties are critical when the foam is to be used to reinforce a hollow structural member, it would be very desirable to have available two part systems exhibiting more controlled foaming and a more uniform cell structure.

Obtaining a foamed epoxy resin with an optimum cellular structure is recognized as quite challenging, as there are a number of interrelated parameters which affect the foaming/curing process. The rheology of the epoxy/curative mixture during the rise of the foam is important, for example. As the epoxy resin crosslinks and cures, the mixture becomes more viscous. This is believed to be necessary to retain the cellular structure produced by expansion of the blowing agent. Coalescence and collapse of the foam will occur if the mixture is insufficiently viscous. On the other hand, a mixture which becomes extremely viscous and gels or sets up too quickly may prematurely terminate the foam rise, thus interfering with full expansion and density reduction. Controlling the viscosity is not straightforward, however, especially since it will vary with the temperature of the mixture, which often changes significantly during the course of curing/foaming and within the mass of the reacting mixture (the core temperature will often, for example, be much higher than the temperature at the outer edges). Another process parameter related to foam rheology is the epoxy cure rate, which is dependent on the processing temperature as well as the chosen epoxy resin and curing agent. If the epoxy-curative system is fast-reacting with a large exotherm, the cure rate may be too rapid to allow the foam to rise. Further, the excessive heat from a large exotherm can lead to burning or charring of the foam interior. If the epoxy reacts too slowly, the exotherm may not be sufficient to fully activate the blowing agent. Other processing parameters which influence foam quality and cell structure include surface tension and cell nucleation.

SUMMARY OF THE INVENTION

The invention provides a two component system capable of being cured to provide a structural reinforcement adhesive. When a blowing agent is present, expansion takes place to provide a reinforcing foam. One component (Component A) comprises one or more epoxy resins. In one particularly preferred embodiment, Component A comprises at least one epoxy resin which is a glycidyl ether of a polyhydric phenol, at least one reactive diluent, at least one rubber (preferably a liquid nitrile rubber), hollow glass microspheres, at least one thixotropic agent and at least one thermally activated blowing agent such as expandable microspheres. Component B comprises a curative system comprised of at least one aliphatic polyamine, at least one amidoamine, at least one alcohol, and at least one adduct of a polyamine and an epoxide. Hollow inorganic (preferably, glass) microspheres are present in one or both of Components A and B. In one preferred embodiment of the invention, at least one rubber and at least one thixotropic agent are also present in Component B. Component B exhibits good storage stability (e.g., minimal phase separation). Combining the two components initiates exothermic reaction of the epoxy resin(s) and the curative system; the heat evolved causes the blowing agent to activate and foam the mixture.

The curing and expansion (when a blowing agent is present) proceed in a remarkably controlled fashion to provide a foam having uniform cell structure. Minimal gassing, burning or cracking takes place in the interior of the foam, even when a relatively large mass of the two part system is employed. This was quite surprising, since normally considerable problems are encountered when attempting to cure and foam a large quantity of an epoxy resin due to the greater potential for developing high internal (core) temperatures as compared to a small quantity where dissipation of the heat generated during the exothermic reaction can take place more readily. The ability to reproducibly obtain a foam of consistent quality was also unexpected in view of the difficulties generally encountered in trying to control and adjust all of the different processing parameters known to affect expansion of an epoxy resin.

When cured, foams provided by the present invention can have compression strengths in the range of from about 140 to about 280 kg/cm$^2$ (about 2000 to about 4000 psi) and a modulus in the range of from about 6300 to about 10,500 kg/cm$^2$ (about 90,000 to about 150,000 psi). The foams also may have remarkably high compression strength (e.g., about 100 kg/cm$^2$ or 1500 psi) at 80° C. (175° F.). Without wishing to be bound by theory, it is believed that this may be attributable to the highly crosslinked character and the resulting relatively high glass transition temperature. of the organic component of the foam. The two part system of the present invention thus is well suited for reinforcing parts which are exposed to elevated temperatures such as, for example, structural members which are located near the exhaust system of a vehicle.

DETAILED DESCRIPTION OF THE INVENTION

The composition of the curative system employed in the B component of the thermosettable compositions of the invention is critical. The curative system must contain at least the following substances in order to obtain a structural reinforcing foam having a uniform cell structure which is substantially free of large holes or voids and which has improved compression strength and modulus:

(a) at least one aliphatic polyamine;
(b) at least one amidoamine;
(c) at least one alcohol; and
(d) at least one adduct of a polyamine and epoxide.

Suitable aliphatic polyamines include the class of organic substances containing 2 or more nitrogen atoms and having an aliphatic character. Preferably, at least 2 primary and/or secondary amine groups are present in the aliphatic polyamine. Aliphatic polyamines are well-known in the field of epoxy curing agents and are described, for example, in U.S. Pat. No. 2,575,558 (incorporated herein by reference in its entirety) and Hull et al., "Epoxy Curing Agents", pp. 277–299.

Polyalkylene polyamines are a preferred class of aliphatic polyamines, with the polyethylene polyamines being especially preferred. In one embodiment of the invention, the aliphatic polyamine corresponds to the generic structure

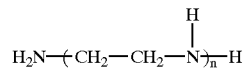

wherein n preferably is 1–6.

Specific examples of such aliphatic polyamines include diethylene triamine, triethylene tetramine, and tetraethylene pentamine.

Suitable amidoamines include the class of organic substances obtainable by reacting one or more monobasic fatty acids with aliphatic polyamines. The use of tall oil fatty acids is especially preferred. Preferred aliphatic polyamines for reaction with the monobasic fatty acids include the polyalkylene polyamines described hereinabove. As used herein, the term "amidoamine" includes not only the simple amidoamines initially formed in the fatty acid reaction but also the imidazoline containing products obtainable by further reacting the simple amidoamines to effect ring closure. Amidoamines are well-known in the art and are described in the aforementioned Hull et al. reference. Suitable amidoamines are also available from commercial sources, and include the products sold by Shell Chemicals under the designations EPI-CURE 3010, EPI-CURE 3015, EPI-CURE 3025, EPI-CURE 3030, EPI-CURE 3046, EPI-CURE 3055 (an especially preferred amidoamine) EPI-CURE 3060, EPI-CURE 3061, EPI-CURE 3070, EPI-CURE 3072, and EPI-CURE 3090.

Suitable alcohols include the class of organic substances containing 1 or more —OH groups (preferably, at least 2 —OH groups). While aliphatic alcohols may be used, aromatic alcohols (e.g., phenols) are generally preferred. Polyhydric phenols (i.e., phenols having two or more hydroxy groups attached to aromatic rings) are especially preferred for use in the present invention. Bisphenol A is an example of a particularly preferred polyhydric phenol. Other illustrative polyhydric phenols include but are not limited to, bisphenol F, phenol-formaldehyde and cresol-formaldehyde condensates (novolacs), bisphenol AD, catechol, resorcinol, and the like. The alcohol may be supplied to the curative system in the form of a mixture with an aliphatic polyamine. For example, EPI-CURE 3271 (a curative which is a mixture of diethylene triamine and bisphenol A, available from Shell Chemicals) may be utilized.

Also present in the curative system are one or more polyamine/epoxide adducts. Such adducts are formed by reaction of a compound having 2 or more primary and/or secondary amine groups and a compound having at least 1 epoxy group (preferably, no more than 1 epoxy group). The polyamine is preferably aliphatic, more preferably a polyalkylene polyamine, most preferably a polyethylene polyamine such as diethylene triamine, triethylene tetramine or tetraethylene pentamine. Preferably, an excess of amine is used so that the adduct contains some proportion of primary and/or secondary amine groups. Suitable epoxides include monoepoxides such as epoxides of $C_2$–$C_{20}$ mono-olefins such as ethylene oxide, propylene oxide and longer chain epoxides, monoglycidyl ethers (e.g. butyl glycidyl ether) and monoglycidyl esters. Adducts derived from glycidyl esters of $C_2$–$C_{24}$ aliphatic carboxylic acids (especially branched carboxylic acids containing at least one tertiary or quaternary carbon atom, including $C_6$–$C_{22}$ alpha, alpha-dialkylalkane and alpha-alkylalkane monocarboxylic acids such as tert-decanoic acid and the like) give particularly favorable results in the present invention. Suitable epoxide/amine adducts are readily available from commercial sources. For example, EPI-CURE 3295 curative, which is a mixture of triethylene tetramine and an adduct of triethylene tetramine and CARDURA E10 tert-decanoic acid oxiranyl methyl ester available from Shell Chemicals, has been found to work exceptionally well.

Any of the thermosettable resins having an average of more than one (preferably about two or more) epoxy groups per molecule known or referred to in the art may be utilized as the epoxy resin component of the present invention.

Epoxy resins are described, for example, in the chapter entitled "Epoxy Resins" in the Second Edition of the *Encyclopedia of Polymer Science and Engineering,* Volume 6, pp. 322–382 (1986). Exemplary epoxy resins include polyglycidyl ethers obtained by reacting polyhydric phenols such as bisphenol A, bisphenol F, bisphenol AD, catechol, resorcinol, or polyhydric alcohols such as glycerin and polyethylene glycol with haloepoxides such as epichlorohydrin; glycidylether esters obtained by reacting hydroxycarboxylic acids such as p-hydroxybenzoic acid or beta-hydroxy naphthoic acid with epichlorohydrin or the like; polyglycidyl esters obtained by reacting polycarboxylic acids such as phthalic acid, tetrahydrophthalic acid or terephthalic acid with epichlorohydrin or the like; epoxidated phenolic-novolac resins (sometimes also referred to as polyglycidyl ethers of phenolic novolac compounds); epoxidated polyolefins; glycidylated aminoalcohol compounds and aminophenol compounds, hydantoin diepoxides and urethane-modified epoxy resins. Mixtures of epoxy resins may be used if so desired; for example, mixtures of liquid (at room temperature), semi-solid, and/or solid epoxy resins can be employed. Any of the epoxy resins available from commercial sources are suitable for use in the present invention. Such commercially available epoxy resins are frequently mixtures obtained by reaction of polyhydric phenols with epichlorohydrin; these mixtures contain epoxy resin molecules varying somewhat in their degree of condensation. Preferably, the epoxy resin has an epoxide equivalent molecular weight of from about 150 to 1000. The use of epoxy resins based on glycidyl ethers of bisphenol A is especially advantageous. The epoxy resin preferably contains an average of about 2 epoxy groups per molecule and should be selected so as to provide the desired combination of properties in both the thermosettable composition and the final cured thermoset and composite prepared therefrom.

Hollow inorganic microspheres (sometimes referred to as microbubbles or microballoons) are added to Component A, Component B or both Component A and B to reduce the density of the thermoset while maintaining good strength and stiffness. Without wishing to be bound by theory, it is believed that the presence of hollow inorganic microspheres, particularly at relatively high loadings (e.g., at least about 15% by weight of the thermosettable composition), may play an important role in moderating the exothermic reaction by functioning as a heat sink. The air contained in the microspheres can readily absorb energy, thereby regulating the temperature rise encountered upon mixing of Component A and Component B. Hollow glass microspheres are especially preferred for use. Commercially available hollow glass microspheres include the materials sold by Minnesota Mining & Manufacturing under the trademark SCOTCHLITE, with suitable grades including those available under the designations B38, C15, K20 and VS 5500. The glass microspheres preferably have diameters in the range of from about 5 to 200 micrometers (preferably, no greater than 70 micrometers). The crush strength of the hollow glass microspheres may be selected in accordance with the desired characteristics of the cured thermoset or composite containing such thermoset. If the two part system is to be processed or applied using conventional pumping equipment, it will be beneficial to use hollow glass microspheres having a crush strength of at least about 140 kg/cm$^2$ (2000 psi), more preferably at least about 210 kg/cm$^2$ (3000 psi), and most preferably at least about 280 kg/cm$^2$ (4000 psi).

Other types of fillers may also optionally be present in the thermosettable composition. Any of the conventional organic or inorganic fillers known in the thermosettable resin art may be used including, for example, silica (including fumed or pyrogenic silica, which may also function as a thixotropic or rheological control agent), calcium carbonate (including coated and/or precipitated calcium carbonate, which may also act as a thixotropic or rheological control agent, especially when it is in the form of fine particles), fibers (e.g., glass fibers, wollastonite fibers, carbon fibers, ceramic fibers, aramid fibers), calcium oxide, talc, hydrated aluminum silicate, feldspar, wollastonite (including high aspect wollastonite), alumina, clays, sand, metals (e.g., aluminum powder), macrospheres and microspheres comprised of materials such as glass, ceramics, thermoplastic resins, thermoset resins, and carbon (all of which may be solid or hollow, expanded or expandable) and the like.

In one embodiment of the invention, the ingredients of the thermosettable composition and the relative proportions of said ingredients are selected such that the thermosettable composition formed by combining Component A and Component B is pumpable. That is, such thermosettable composition is capable of being pumped into a hollow space or cavity where reinforcement is desired (such, as for example, a pillar or hydroformed part of a vehicle which is otherwise not readily accessible).

The thermosettable compositions of the invention may be formulated to include one or more additional components, including, for example, blowing agents (to render the composition expandable/foamable), fillers, colorants, thixotropic agents (Theological control agents), toughening or flexibilizing agents (including rubbers), stabilizers, and the like. If the thermosettable composition viscosity is too low due to, for example, the presence of liquid components such as low molecular weight epoxy resins or reactive diluents, thixotropic agents such as fumed silica (especially hydrophobic fumed silica), coated calcium carbonate, clays, bentonites, and the like can be added. The type(s) and amount(s) of thixotropic agent(s) employed are, in certain embodiments of the invention, selected such that Component A, Component B, and/or the thermosettable composition obtained by mixing Components A and B flow at ambient temperatures only when subjected to high shear. It is particularly desirable that the thermosettable compositions obtained by mixing of Components A and B be non-flowable in the absence of high shear, as this will enable the uncured composition to be easily retained in the desired location of a cavity prior to completion of curing. This is advantageous since it avoids the need to contain the uncured composition within a bag or other device to prevent it from running out of the cavity. Generally speaking, it will be preferred for each of the components to have a viscosity within the range of about 150,000 to about 400,000 centipoise at room temperature.

Expandable or foamable thermosettable compositions represent a particularly preferred embodiment of the present invention. Selection of the blowing agent or blowing agents to be used is not believed to be particularly critical. However, the blowing agents are preferably thermally activated so that the component containing said blowing agent is stable at normal storage temperatures. Upon mixing of Components A and B, the resulting thermosettable composition foams or expands as a result of the activation of the blowing agents by the heat generated from the exothermic crosslinking reaction of the curing system and the epoxy resin. By expanding in this manner, the thermosettable composition fills the cavity in which it is disposed. Good adhesion to the interior surfaces of the cavity is obtained, as the expanding thermosettable composition is capable of occupying voids and irregularities in said surfaces. This high degree of contact with the cavity surfaces serves to enhance the final physical properties of the resulting reinforced cavity. At the same time, however, the weight increase is minimized due to the relatively low density of the thermoset foam.

Chemical blowing agents as well as physical blowing agents are generally suitable for use. Any of the chemical blowing agents known in the art may be employed, such as, for example, azodicarbonamide and sulfonyl hydrazides. The chemical blowing agent should, however, be selected to have an activation temperature which is sufficiently low to enable the desired conversion of the blowing agent to a gas to take place at the temperatures generated by the exothermic reaction of Components A and B.

Expandable thermoplastic resin microspheres (which can comprise, for example, volatile physical blowing agents such as hydrocarbons or halocarbons encapsulated in thermoplastic shells) are preferably employed to render the thermosettable composition foamable. The thermoplastic shells may be comprised of acrylic-type resins such as polymethylmethacrylate, acrylic-modified polystyrene, polyvinylidene chloride, styrene/MMA copolymers and the like. Particularly preferred expandable microspheres are available from Akzo Nobel AB under the trademark EXPANCEL. The amount and type of expandable microsphere utilized may each be readily varied to obtain the desired degree of expansion (typically, from about 5% to about 150%; in preferred embodiments, from about 35% to about 70%).

Other optional components include diluents (reactive or non-reactive) such as glycidyl ethers, glycidyl esters, acrylics, solvents and plasticizers, toughening or flexibilizing agents (e.g., aliphatic diepoxides, polyaminoamides, liquid polysulfide polymers), wetting agents, adhesion promoters, coupling agents, anti-corrosion agents, surfactants, nucleating agents, odorants (e.g., pine oil), colorants (e.g., dyes and pigments such as carbon black), stabilizers (e.g., antioxidants, UV stabilizers) and the like. Especially preferred reactive diluents include the glycidyl ethers of monohydroxy phenols such as cresol and p-tert-butyl phenol (the latter glycidyl ether being preferred due to its lower volatility).

It is particularly advantageous to include or more rubbers in the thermosettable composition, as such additives will toughen the thermoset and reduce the tendency of the thermoset to crack under stress. As used herein, the term "rubbers" includes both rubbers and elastomers. Suitable rubbers include thermoplastic as well as thermosettable (reactive) rubbers. Illustrative types of rubber include styrene-butadiene rubbers (SBR), nitrile-butadiene rubbers, butyl rubbers, polyisoprene, natural rubber, polybutadiene, chlorobutyl rubbers (neoprene), isobutylene polymers, alpha-olefin elastomers, ethylene-propylene elastomers, chlorosulfonated polyethylenes, ethylene-propylene-diene (EPDM) rubbers, and the like. Thermoplastic block copolymers are one particularly preferred class of rubbers for use in the present invention. Such materials contain one or more base segments ("A") covalently bonded to one or more soft or elastomeric segments ("B"). The A segments may be polystyrene, poly (alpha-methylstyrene), polyethylene, polyurethane, polysulfone, polyester, polycarbonate or the like. The B segments may be polybutadiene, polyisoprene, poly (ethylene-cobutylene), polydimethylsiloxane, polyether, or the like. The block copolymers may have a linear, branched, radial or star structure and may, for example, correspond to the general structure A-B-A, (A-B)$_n$, and so forth. SIS, SEBS and SBS block copolymers are examples of specific types of such materials.

Nitrile rubbers such as butadiene-acrylonitrile copolymers are an especially preferred type of rubber modifier when the thermosettable composition is expandable. Such rubbers are preferably liquid and may optionally be functionalized with carboxy groups, amine groups, or other groups capable of reacting with other ingredients of the thermosettable composition. Without wishing to be bound by theory it is believed that such rubbers may assist in limiting the reaction rate of the thermosettable composition and controlling the expansion, thereby producing a more uniform cell structure and better physical properties than are observed in the absence of such rubbers. The storage stability of Component B, when such component contains hollow glass microspheres in addition to the curative system, also is improved by the presence of such rubbers. That is, phase separation is generally inhibited when liquid nitrile rubbers are added to Component B. Storage stability is also enhanced by the addition of hydrophobic fumed silica and/or wollastonite.

The relative amounts of the above-described components may, in particular embodiments of the invention, correspond to the following ranges:

| Component A | | |
|---|---|---|
| | Preferred | More Preferred |
| Epoxy Resin | about 40 to about 85 wt % | about 55 to about 75 wt % |
| Reactive Diluent | 0 to about 25 wt % | about 1 to about 15 wt % |
| Rubber | 0 to about 20 wt % | about 0.1 to about 5 wt % |
| Hollow Glass Microspheres | 0 to about 50 wt % | about 5 to about 30 wt % |
| Thixotropic Agent | 0 to about 15 wt % | about 0.5 to about 7 wt % |
| Blowing Agent | 0 to about 10 wt % | about 0.5 to about 5 wt % |

| Component B | | |
|---|---|---|
| | Preferred | More Preferred |
| Aliphatic Polyamine | about 0.5 to about 30 wt % | about 1 to about 20 wt % |
| Amidoamine | about 5 to about 50 wt % | about 10 to about 35 wt % |
| Alcohol | about 0.1 to about 20 wt % | about 0.5 to about 10 wt % |
| Polyamine/Epoxide Adduct | about 0.1 to about 20 wt % | about 0.5 to about 10 wt % |
| Rubber | 0 to about 50 wt % | about 10 to about 30 wt % |
| Thixotropic Agent | 0 to about 20 wt % | about 0.5 to about 8 wt % |
| Hollow Glass Microspheres | 0 to about 60 wt % | about 10 to about 50 wt % |

In an especially preferred embodiment of the invention, Component A comprises:

| | |
|---|---|
| Epoxy Resin[1] | about 60 to about 73 wt % |
| Reactive Diluent[2] | about 8.0 to about 9.9 wt % |
| Colorant | about 0.05 to about 0.2 wt % |
| Clay | about 1.0 to about 1.2 wt % |
| Calcium Oxide | about 1.0 to about 1.2 wt % |
| Fumed Silica | about 2.5 to about 3.1 wt % |
| Liquid Nitrile Rubber | about 1.0 to about 1.4 wt % |
| Expandable Microspheres | about 2.0 to about 2.5 wt % |
| Hollow Glass Microspheres | about 14 to about 17 wt % |

[1] preferably diglycidyl ether of bisphenol A, epoxy equivalent weight from about 170 to about 220
[2] preferably glycidyl ether of mono-hydroxy phenolic compound, epoxy equivalent weight of about 150 to about 330

In an especially preferred embodiment of the invention, Component B

| | |
|---|---|
| Adduct of Polyamine and Epoxide/Aliphatic Polyamine Mixture[1] | about 8.5 to about 10.5 wt % |
| Aliphatic Polyamine/Polyhydric Phenol Mixture[2] | about 7 to about 11 wt % |
| Amidoamine/Aliphatic Polyamine[3] | about 23 to about 28 wt % |
| Liquid Nitrile Rubber | about 17 to about 23 wt % |
| Fumed Silica | about 3 to about 5 wt % |
| High Aspect Wollastonite | about 0.2 to about 0.5 wt % |
| Hollow Glass Microspheres | about 28 to about 34 wt % |
| Odorant | about 0.1 to about 1 wt % |

[1]preferably, adduct of triethylene tetramine (in excess) + tert-decanoic acid oxiranyl methyl ester; amine value about 870 to about 970; equivalent wt about 40 to about 50
[2]preferably, diethylene triamine and bisphenol A; amine value about 900 to about 1100; equivalent wt about 30 to about 40
[3]preferably, amidoamine based on tall oil fatty acid and tetraethylene pentamine (in excess); amine value about 440 to about 480; equivalent wt about 85 to about 90

Using the preferred compositions of Component A and Component B described hereinabove, the preferred mixing ratio of Component A:Component B is from about 1.9:1 to about 2.7:1 (volume:volume).

The relative proportions of Component A and Component B are preferably selected such that the equivalents ratio of epoxy:amine is from about 0.5:1 to about 1:0.5, more preferably from about 0.65:1 to about 1:0.65, most preferably from about 0.8:1 to about 1:0.8. One of the important advantages of the present invention is that the physical and mechanical properties of the resulting thermoset (e.g., compression strength and compression modulus) are remarkably insensitive to the exact ratio of epoxy to amine achieved when the two components of the system are combined. Thus, minor variations in the relative proportions of Component A and Component B during mixing and processing will not have a significant impact on the performance of the structural reinforcing adhesive thereby produced.

The thermosettable compositions of the present invention may be utilized in any end-use application where an adhesive, sealant or coating is required. However, the thermosettable compositions are especially useful in the production of automobiles and other vehicles to maintain or increase the strength of structural members such as rockers, pillars, radiator support beams and the like. For example, an expandable thermosettable composition in accordance with the present invention may be pumped into a hollow joint of a vehicle such as a B pillar/roof joint, D pillar/sill joint, D pillar/roof joint or pillar/rocker joint and expanded and cured to provide a strong lightweight (low density) foam which bonds to the interior surfaces of the joint and increases the stiffness and torsional rigidity of the joint.

EXAMPLES

Component A is prepared by combining 191 pbw EPON 828 liquid epoxy resin (a diglycidyl ether of bisphenol A, available from Shell Chemicals) and 47 pbw HELOXY 62 reactive diluent (a glycidyl ether of cresol, available from Shell Chemicals; an equivalent amount of PEP 6745 reactive diluent, available from Peninsula Polymers, is preferably substituted where a reduction in volatile emissions during curing is desired), mixing two minutes at low speed and then five minutes under high shear. The following materials are then added: 0.5 pbw MONARCH 280 carbon black (available from Cabot), 5.8 pbw CLAYTON AF clay (available from ECC International), 5.8 pbw pulverized calcium oxide (quick lime), 17 pbw CAB-O-SIL TS-720 fumed silica (available from Cabot), and 6.3 pbw NIPOL 1312 liquid nitrile rubber (available from Zeon Chemicals). The mixture is mixed for five minutes under low speed and then 15 minutes under high shear. Thereafter, 81 pbw SCOTCHLITE VS 5500 hollow glass microspheres (available from Minnesota Mining & Manufacturing) and 12 pbw EXPANCEL 551 DU expandable microspheres (available from Akzo Nobel AB) are added, then mixed 5 minutes at low speed and 10 minutes under high shear. Finally, 159 pbw EPON 828 liquid epoxy resin are added and mixed 3 minutes at low shear and 5 minutes under high shear. A vacuum (20–22 inches Hg) is applied and mixing continued at medium speed for 20 minutes to yield Component A. Component A thus has the following composition, by weight percent:

| | |
|---|---|
| Liquid Epoxy Resin | 66.6 |
| Reactive Diluent | 9.0 |
| Carbon Black | 0.1 |
| Clay | 1.1 |
| Calcium Oxide | 1.1 |
| Fumed Silica | 3.3 |
| Rubber | 1.2 |
| Hollow Glass Microspheres | 15.5 |
| Expandable Microspheres | 2.2 |

Component B is prepared by combining 78 pbw EPICURE 3295 curative (a mixture containing triethylene tetramine and an adduct of triethylene tetramine/tert-decanoic acid oxiranyl methyl ester, available from Shell Chemicals), 165 pbw NIPOL 1312 liquid nitrile rubber, 33 pbw NYAD G wollastonite (available from Nyco), and 74 pbw EPICURE 3271 curative (a mixture containing diethylene triamine and bisphenol A, available from Shell Chemicals), mixing at low speed until incorporated and then continuing mixing at high speed until the particles present in the mixture are completely dispersed. Thereafter, 210 pbw EPICURE 3055 curative (a mixture containing amidoamine based on tall oil fatty acid and tetraethylene pentamine, available from Shell Chemicals) and 4 pbw pine oil (used to improve the product odor) are added, mixed at low speed 3 minutes, mixed at high speed for 7 minutes, and then mixed under vacuum (20–22 inches Hg) for 20 minutes. The resulting Component B has the following composition, in weight percent:

| | |
|---|---|
| Aliphatic Polyamine + Aliphatic Polyamine/Glycidyl Ester Adduct Curative | 9.48 |
| Rubber | 20.05 |
| Fumed Silica | 4.01 |
| Wollastonite | .36 |
| Aliphatic Polyamine + Bisphenol A Curative | 8.99 |
| Amidoamine + Aliphatic Polyamine Curative | 25.52 |
| Hollow Glass Microspheres | 31.11 |
| Pine Oil | .49 |

Component A and Component B may be stored in suitable separate containers such as, for example, 55 gallon drums or 300 gallon totes. Each component exhibits exceptional storage stability, with little or no phase separation or increase in viscosity. The components are pumped out of the storage containers using a two part pump system such as, for example, the SCA 2K dispensing system supplied by Schucker. The components are conditioned at the desired preselected temperature for a suitable period of time (e.g., at least about half an hour) prior to mixing. Component A and Component B may be mixed by any suitable method such as feeding each component in the desired ratio into one end of a static mixer having an effective number of mixing elements. Using the specific formulations exemplified hereinabove, for instance, typically about 2 parts by volume of Component A is combined with about 1 part by weight of Component B (corresponding to a weight ratio of Component A to Component B of about 3:1) Thorough and complete mixing of the components is important to avoid the formation of incompletely cured regions in the final thermoset. To monitor the degree of mixing, it may be helpful to include a colorant such as carbon black in one component. Mixing is considered to be completed when the combined components exhibit a uniform coloration.

The mixture of Component A and Component B is thereafter introduced into the cavity or hollow section where structural reinforcement is desired. This may be readily accomplished by pumping, for example. The temperature of the mixture when dispensed is typically from about 30° C. to about 70° C. Generally speaking, a minimum of about 50 g (more preferably at least about 100 g; most preferably at least about 200 g) of the mixture should be employed in order to ensure an exotherm of sufficient magnitude to foam and cure the mixture within a desirably short period of time (unless, of course, heat is supplied from an outside source). The component mixture normally cures to a point where it is no longer pumpable within about 30 to about 60 minutes after the components are combined. This will depend to some extent, of course, on the initial temperature of the components, the reactivities of the constituents of each component, and other factors. Typically, complete or near complete cure is achieved within about 48 hours. One advantage of the present invention is that it generally not necessary to apply external heat to accomplish or assist complete curing, although heat could be applied if so desired.

What is claimed is:

1. A two component system capable of being cured to provide a structural reinforcement adhesive, said two component system comprising Component A and Component B, wherein Component A comprises at least one epoxy resin and Component B comprises at least one aliphatic polyamine, at least one amidoamine, at least one alcohol, and at least one adduct of a polyamine and an epoxide, wherein at least one of Component A or Component B additionally comprises hollow inorganic microspheres.

2. The two component system of claim 1 wherein Component A comprises at least one epoxy resin which is a glycidyl ether of a polyhydric phenol.

3. The two component system of claim 1 wherein Component A additionally comprises at least one reactive diluent.

4. The two component system of claim 1 wherein Component A additionally comprises at least one rubber.

5. The two component system of claim 1 wherein Component B additionally comprises hollow glass microspheres.

6. The two component system of claim 1 wherein Component A additionally comprises at least one thixotropic agent.

7. The two component system of claim 1 wherein Component A additionally comprises at least one blowing agent.

8. The two component system of claim 1 wherein Component A additionally comprises expandable microspheres.

9. The two component system of claim 1 wherein Component B additionally comprises at least one rubber.

10. The two component system of claim 1 wherein Component B additionally comprises at least one thixotropic agent.

11. The two component system of claim 1 wherein the weight ratio of Component A to Component B is selected such that the equivalent ratio of epoxy:amine is from about 0.5:1 to about 1:0.5.

12. A two component system capable of being expanded and cured to provide a structural reinforcement foam, said two component system comprising Component A and Component B, wherein Component A comprises:
at least one epoxy resin which is a glycidyl ether of a polyhydric phenol;
at least one reactive diluent;
at least one rubber;
hollow inorganic microspheres;
at least one thixotropic agent; and
expandable microspheres;
and Component B comprises:
at least one aliphatic polyamine;
at least one amidoamine;
at least one alcohol;
at least one adduct of a polyamine and an epoxide;
at least one rubber;
at least one thixotropic agent; and
hollow inorganic microspheres.

13. The two component system of claim 12 wherein Component A comprises at least one epoxy resin which is a diglycidyl ether of bisphenol A.

14. The two component system of claim 12 wherein at least one reactive diluent is a mono glycidylether of a phenol.

15. The two component system of claim 12 wherein at least one rubber is a nitrile rubber.

16. The two component system of claim 12 wherein the hollow glass microspheres have a crush strength of at least about 2000 psi.

17. The two component system of claim 12 wherein at least one thixotropic agent is fumed silica.

18. The two component system of claim 12 wherein at least one thixotropic agent is hydrophobic fumed silica.

19. The two component system of claim 12 wherein at least one aliphatic polyamine corresponds to the generic structure

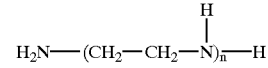

wherein n=1–6.

20. The two component system of claim 12 wherein at least one amidoamine is an aliphatic amidoamine prepared by reacting an aliphatic polyamine with a fatty acid.

21. The two component system of claim 12 wherein at least one alcohol is an aromatic alcohol.

22. The two component system of claim 12 wherein at least one alcohol is a polyhydric phenol.

23. The two component system of claim 12 wherein at least one alcohol is bisphenol A.

24. The two component system of claim 12 wherein at least one adduct is an adduct of an aliphatic polyamine corresponding to the general structure

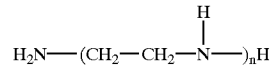

wherein n=1–6.

25. The two component system of claim 12 wherein at least one adduct is an adduct of a glycidyl ester.

26. The two component system of claim 12 wherein at least one adduct is an adduct of a glycidyl ester of a $C_2$–$C_{24}$ aliphatic carboxylic acid.

27. The two component system of claim 12 wherein Component A has the following composition:

| | |
|---|---|
| Epoxy Resin | about 55 to about 75 wt % |
| Reactive Diluent | about 1 to about 15 wt % |
| Rubber | about 0.1 to about 5 wt % |
| Hollow Glass Microspheres | about 5 to about 30 wt % |
| Thixotropic Agent | about 0.5 to about 7 wt % |
| Expandable Microspheres | about 0.5 to about 5 wt %. |

28. The two component system of claim 12 wherein Component B has the following composition:

| | |
|---|---|
| Aliphatic Polyamine | about 1 to about 20 wt % |
| Amidoamine | about 10 to about 35 wt % |
| Alcohol | about 0.5 to about 10 wt % |
| Adduct of Polyamine and Epoxide | about 0.5 to about 10 wt % |
| Rubber | about 10 to about 30 wt % |
| Thixotropic Agent | about 0.5 to about 8 wt % |
| Hollow Glass Microspheres | about 10 to about 50 wt %. |

29. The two component system of claim 12 wherein one or both of Component A and Component B additionally comprise at least one filler.

30. The two component system of claim 12 wherein one or both of Component A and Component B additionally comprise at least one filler selected from the group consisting of clays, wollastonite, and calcium oxide.

31. The two component system of claim 12 wherein at least one adduct is an adduct of a glycidyl ester of a $C_6$–$C_{22}$ alpha-alkylalkane monocarboxylic acid.

32. The two component system of claim 12 wherein at least one adduct is an adduct of an aliphatic polyamine containing at least two amine groups selected from the group consisting of primary amine groups, secondary amine groups, and combinations thereof.

33. The two component system of claim 12 wherein at least one adduct contains one or more amine groups which are not reacted with epoxide.

34. A method of curing a thermosettable composition comprised of at least one epoxy resin and hollow glass microspheres, said method comprising combining said thermosettable composition with a curative system comprising (a) at least one aliphatic polyamine;
(b) at least one amidoamine;
(c) at least one alcohol; and
(d) at least one adduct of an aliphatic polyamine and an epoxide;

and initiating exothermic reaction of the thermosettable composition and the curative system.

35. A method of preparing a structural reinforcing foam comprising combining a thermosettable expandable composition comprised of (a) at least one epoxy resin which is a glycidyl ether of a polyhydric phenol;
(b) at least one reactive diluent;
(c) at least one rubber;
(d) hollow glass microspheres;
(e) at least one thixotropic agent; and
(f) expandable microspheres;

with a curative system comprising (a) at least one aliphatic polyamine;
(b) at least one amidoamine;
(c) at least one alcohol; and
(d) at least one adduct of an aliphatic polyamine and an epoxide and initiating exothermic reaction of the thermosettable composition and the curative system and expansion of the expandable microspheres.

36. A method of reinforcing a substrate having a surface, said method comprising combining at least one epoxy resin, hollow glass microspheres, and a curative system comprised of at least one aliphatic polyamine, at least one amidoamine, at least one alcohol, and at least one adduct of a polyamine and an epoxide to form a mixture, applying said mixture to said surface, and curing said mixture.

37. A method of reinforcing a structural member having a cavity, said method comprising:

(A) combining
  (i) at least one epoxy resin which is a glycidyl ether of a polyhydric phenol;
  (ii) at least one reactive diluent;
  (iii) at least one rubber;
  (iv) hollow glass microspheres;
  (v) at least one thixotropic agent;
  (vi) expandable microspheres; and
  (vii) a curative system comprised of
    (a) at least one aliphatic polyamine;
    (b) at least one amidoamine;
    (c) at least one alcohol; and
    (d) at least one adduct of a polyamine and an epoxide;
  to form a pumpable mixture;

(B) introducing said pumpable mixture into said cavity; and (C) curing and expanding said pumpable mixture to provide a structural reinforcement foam within said cavity.

38. A structural reinforcement adhesive which is the reaction product of at least one epoxy resin, hollow glass microspheres, and a curative system comprising at least one aliphatic polyamine, at least one amidoamine, at least one alcohol, and at least one adduct of an aliphatic polyamine and an epoxide.

39. A structural reinforcement foam which is the reaction product of:

(a) at least one epoxy resin which is a glycidyl ether of a polyhydric phenol;
(b) at least one reactive diluent;
(c) at least one nitrile rubber;
(d) hollow glass microspheres;
(e) at least one thixotropic agent;
(f) expandable microspheres; and
(g) a curative system comprising
  (i) at least one aliphatic polyamine;
  (ii) at least one amidoamine;
  (iii) at least one alcohol; and
  (iv) at least one adduct of an aliphatic polyamine and an epoxide.

40. A component useful in curing a second component comprised of epoxy resin, said component comprising at least one aliphatic polyamine, at least one amidoamine, at least one alcohol, and at least one adduct of polyamine and an epoxide.

41. The component of claim 40, wherein said component additionally comprises hollow glass microspheres.

42. The component of claim 40, wherein said component additionally comprises at least one rubber.

43. The component of claim 40, wherein said component additionally comprises at least one thixotropic agent.

44. The component of claim 40, wherein said component additionally comprises hollow glass microspheres, at least one rubber and at least one thixotropic agent.

45. The component of claim 40, wherein at least one aliphatic polyamine corresponds to the generic structure

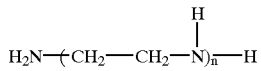

wherein n=1–6.

46. The component of claim 40, wherein at least one amidoamine is an aliphatic amidoamine prepared by reacting an aliphatic polyamine with a fatty acid.

47. The component of claim 40, wherein at least one alcohol is an aromatic alcohol.

48. The component of claim 40, wherein at least one alcohol is a polyhydric phenol.

49. The component of claim 40, wherein at least one alcohol is bisphenol A.

50. The component of claim 40, wherein at least one adduct is an adduct of an aliphatic polyamine corresponding to the general structure

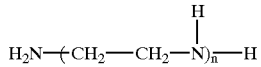

wherein n=1–.

51. The component of claim 40, wherein at least one adduct is an adduct of a glycidyl ester.

52. The component of claim 40, wherein at least one adduct is an adduct of a glycidyl ester of a $C_2$–$C_{24}$ aliphaticcarboxylic acid.

53. A component useful in curing a second component comprised of an epoxy resin, said component comprising:

a) a first aliphatic polyamine corresponding to the generic structure of

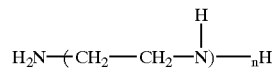

wherein n=1–6.

b) an aliphatic amidoamine prepared by reacting a second aliphatic polyamine, which may be the same as or different from the first aliphatic polyamine, with a fatty acid;

c) an aromatic alcohol;

d) an adduct of a polyamine and a glycidyl ester of a $C_2$–$C_{24}$ aliphatic carboxylic acid; and e) at least one additive selected from the group consisting of rubbers, thixotropic agents and hollow glass microspheres.

54. The component of claim 53 wherein said component comprises at least two additives selected from the group consisting of rubbers, thixotropic agents and hollow glass microspheres.

55. The component of claim 53 wherein said component comprises at least one rubber, at least one thixotropic agent and hollow glass microspheres.

* * * * *

UNITED STATES PATENT AND TRADEMARK OFFICE
CERTIFICATE OF CORRECTION

PATENT NO.   : 6,451,876 B1
DATED        : September 17, 2002
INVENTOR(S)  : Koshy It is certified that error appears in the above-identified patent and that said Letters Patent is hereby corrected as shown below:

Column 15,
Line 29, after "n=1-", insert therefor "6".

Signed and Sealed this

Fifth Day of August, 2003

JAMES E. ROGAN
*Director of the United States Patent and Trademark Office*